March 2, 1948. E. P. NEHER 2,437,206
SHOCK ABSORBING DEVICE
Filed Dec. 22, 1945 3 Sheets-Sheet 1

INVENTOR.
Eldon Paul Neher
BY
Evans & McCoy
ATTORNEYS

March 2, 1948.    E. P. NEHER    2,437,206
SHOCK ABSORBING DEVICE
Filed Dec. 22, 1945    3 Sheets-Sheet 2

INVENTOR.
Eldon Paul Neher
BY
Evans & McCoy
ATTORNEYS

March 2, 1948. E. P. NEHER 2,437,206
SHOCK ABSORBING DEVICE
Filed Dec. 22, 1945 3 Sheets-Sheet 3

INVENTOR.
Eldon Paul Neher
BY
Evans + McCoy
ATTORNEYS

Patented Mar. 2, 1948

2,437,206

UNITED STATES PATENT OFFICE 2,437,206

SHOCK ABSORBING DEVICE

Eldon Paul Neher, North Manchester, Ind., assignor to The General Tire & Rubber Company, Akron, Ohio, a corporation of Ohio Application December 22, 1945, Serial No. 636,547

5 Claims. (Cl. 248—358)

This invention relates to a flexible vibration damping connecting device for absorbing shocks and limiting the transmission of vibrations from one member to another.

The invention has for an object to provide a simple and inexpensive connection that provides effective cushioning of axial, radial, angular and torsional thrusts.

A further object is to provide a flexible vibration damping connection employing elastic rubber cushioning elements so mounted that thrusts in any direction are imposed in shear upon some of the cushioning elements.

With the above and other objects in view, the invention may be said to comprise the connection as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification in which.

Figure 1:
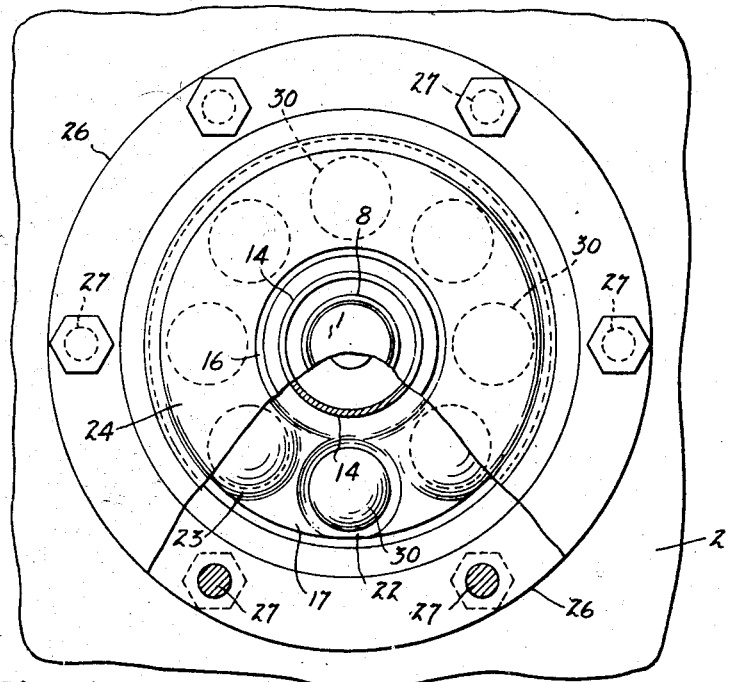
Figure 1 is a plan view of a connection embodying the invention with portions broken away to show the internal construction.
Figures 2, 3, 4:
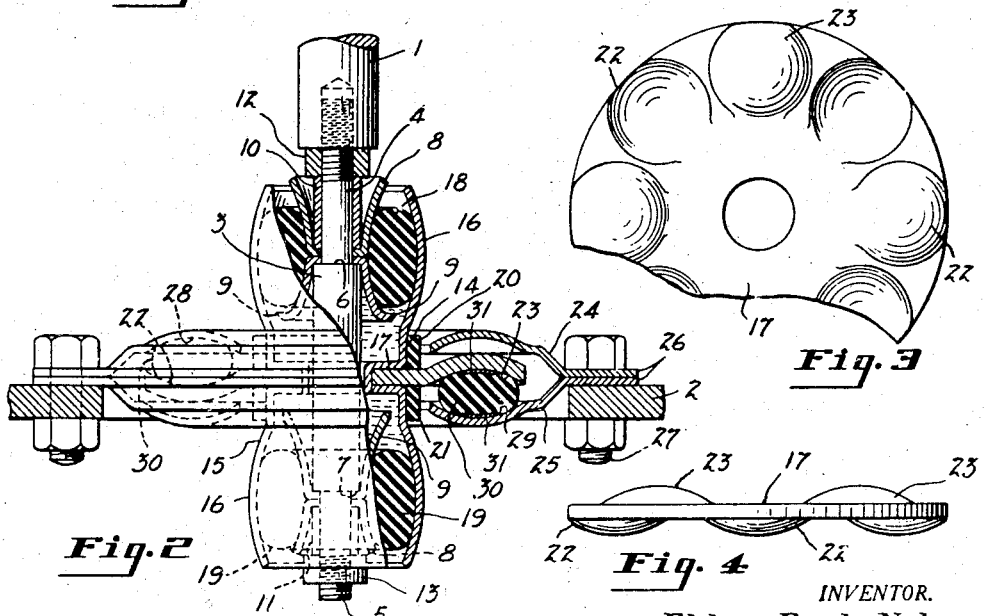
Fig. 2 is a side elevation of the connection shown in Fig. 1 with a portion broken away and shown in central vertical section.
Fig. 3 is a fragmentary plan view of the thrust transmitting disc.
Fig. 4 is a side elevation of the disc.

Referring to Figs. 1 to 4 of the drawings, the connection is shown between a supported member 1 and a supporting member 2 which may be a floor or other horizontal support. The member 1 is supported upon the upper end of a vertical post 3 that has reduced threaded upper and lower ends 4 and 5. The post 3 has shoulders 6 and 7 at the inner ends of the reduced portions 4 and 5 which serve to position mounting cups 8 and 9 that have apertures in their bottoms to receive the reduced portions 4 and 5 of the post. The cup members 8 and 9 flare toward their open ends and are mounted on the post with their bottoms in engagement adjacent the shoulders 6 and 7. The mounting cups 8 and 9 are clamped in place by means of sleeves 10 and 11 which fit upon the reduced portions 4 and 5 of the post and which are clamped against the bottoms of the cups by means of nuts 12 and 13 the nut 12 being interposed between the sleeve 10 and member 1 with which the upper end of the reduced portion of the post may have threaded engagement.

The post 3 is surrounded by a tubular member that is formed of oppositely facing cup shaped sections 14 and 15, each provided with a bulged body portion 16 and arranged with their bottoms engaging a central thrust transmitting disc 17. The mounting cups 8 and 9 and the bulged portion 16 of the sections of the tubular member form concavities to receive elastic rubber cushioning rings 18 and 19 that are preferably held under compression between the concavities formed by the cup members 8 and 9 attached to the post, and the bulged portions 16 of the sections 14 and 15 of the tubular member.

The disc 17 is mounted coaxially with the post 3 and projects outwardly beyond the periphery of the tubular member. The disc 17 which is preferably formed of sheet metal has uniformly and angularly spaced upwardly facing concavities 22 that alternate with downwardly facing concavities 23. Rubber cushioning bands 20 and 21 are provided on the sections 14 and 15 immediately above and below the disc 17.

The thrust transmitting disc 17 is encircled by an annular connecting member that is composed of upper and lower sheet metal rings 24 and 25 that have flat peripheral portions 26 adapted to abut face to face, the inner portions of the rings being spaced apart to provide an interiorly opening channel to receive the peripheral portion of the disc 17. The sheet metal rings 24 and 25 may be secured together and to the support 2 by suitable means such as bolts 27. The upper ring 24 has a transversely concave lower face 28 that registers with the upwardly facing concavities 22 of the disc and the lower ring 25 has a transversely concave upper face 29 that registers with the downwardly facing concavities 23 of the disc. Rubber blocks 30 are mounted between the disc 17 and the rings 24 and 25 and are seated in the registering concavities of the disc and rings. The elastic rubber blocks 30 are preferably under axial compression between the disc 17 and the upper and lower walls of the channel in the outer connecting member, and these blocks may be adhesively secured to the concavities with which they engage by means of a suitable rubber-to-metal adhesive, as indicated at 31 in Fig. 2.

Axial thrusts imposed upon the post 3 are taken in shear by the rubber cushioning members 18 and 19 and radial and torsional thrusts are taken in shear by the elastic rubber cushioning blocks 30 interposed between the thrust transmitting disc 17 and the annular connecting member attached to the member 2. The rubber bands 20 and 21 are engageable with the inner edges of the rings 24 and 25 upon excessive lateral movements of the support and act as snubbers. Tilting movements of the post 3 with respect to the member 2 are yieldably resisted by all of the cushioning elements.

A fluidtight chamber is formed within the tubular member composed of the sections 14 and 15 between the cushioning rings 18 and 19 and this chamber is preferably filled with liquid. The end portions of the sections 14 and 15 which engage the disc 17 form a restricted annular passage around the post 3 which retards the axial flow of liquid to damp vibrations.

Figure 5:
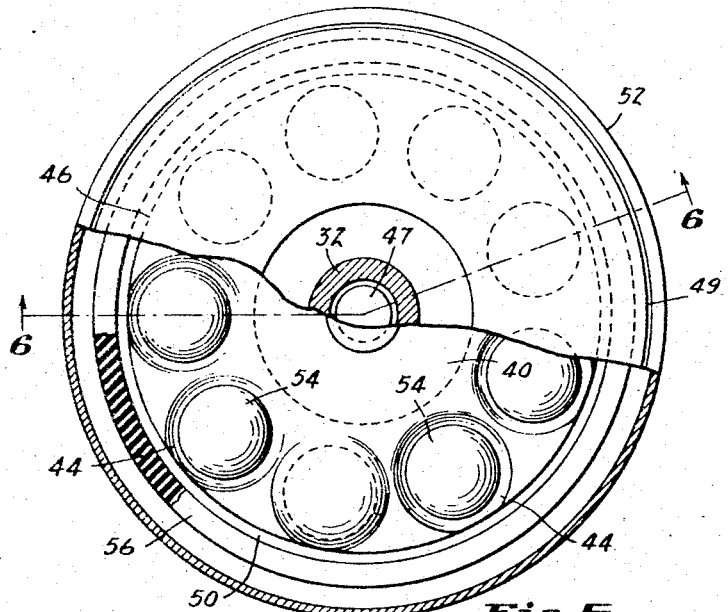
Fig. 5 is a plan view of a modified form of support with a portion broken away to show parts otherwise hidden.
Figure 6:
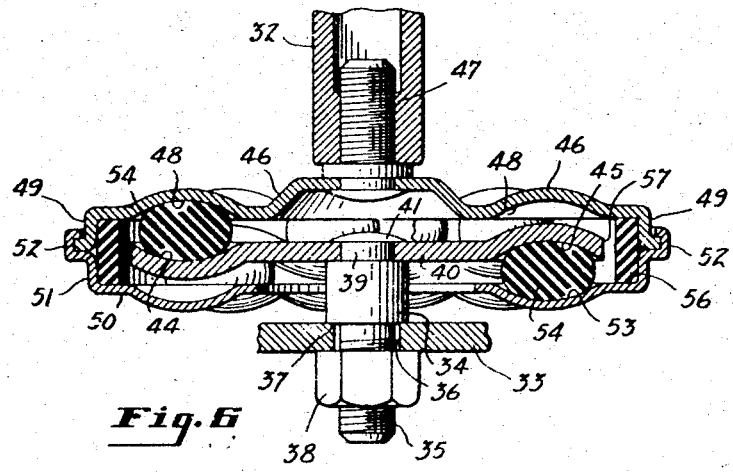
Fig. 6 is a section taken on the line indicated at 6—6 in Fig. 5.

In Figs. 5 and 6 of the drawings a modified form of connection is shown in which a supported member 32 is flexibly connected to a supporting member 33. A supporting post 34 has a reduced threaded lower end 35 that extends downwardly through a hole 36 in the supporting member 33, the post being provided with a shoulder 37 at the upper end of the reduced portion 35 that rests upon the member 33 around the opening 36. A nut 38 clamps the post 34 to the support 33. The post 34 has a reduced upper end 39 that receives a thrust transmitting disc 40 that is concentric with the post, the disc being secured to the post by a riveted head 41 formed at the upper end of the reduced portion 39. The disk 40 has upwardly facing concavities 44 that alternate with downwardly facing concavities 45.

A sheet metal disc 46 overlies the disc 40 and is attached to the supported member 32 by means of a bolt 47 coaxial with the post 34. The disc 46 has concavities 48 on the under side thereof that register with concavities 44 of the disc and at its periphery the disc 46 has a continuous depending flange 49. A ring plate 50 underlies the peripheral portion of the disc 40 and has an upright peripheral flange 51 that is secured to the flange 49 of the disc 46 by means of a standing seam 52 that extends around the circumference of the disc and plate. The plate 50 has upwardly facing concavities 53 adapted to register with the downwardly facing concavities 45 of the disc 40. The disc 46 and plate 50 are formed of sheet metal and provide an annular connecting member that encircles the disc 40 and that has an inwardly facing channel to receive the disc.

Elastic rubber blocks 54 are interposed between the disc 40 and the opposite side walls of the channel formed by the disc 46 and annular plate 50. Seated against the bottom of the channel and surrounding the periphery of the disc 40 there is an elastic rubber bumper ring 56 that is engaged by the transversely flat peripheral flange 49 of the disc 46 upon excessive lateral movements of the disc. The elastic blocks 54 seated in the oppositely facing concavities of the disc and channel take radial and torsional thrusts in shear and the pumper 56 serves to limit the amplitude of vibrations of one of the connecting members relative to the other.

Figure 7:
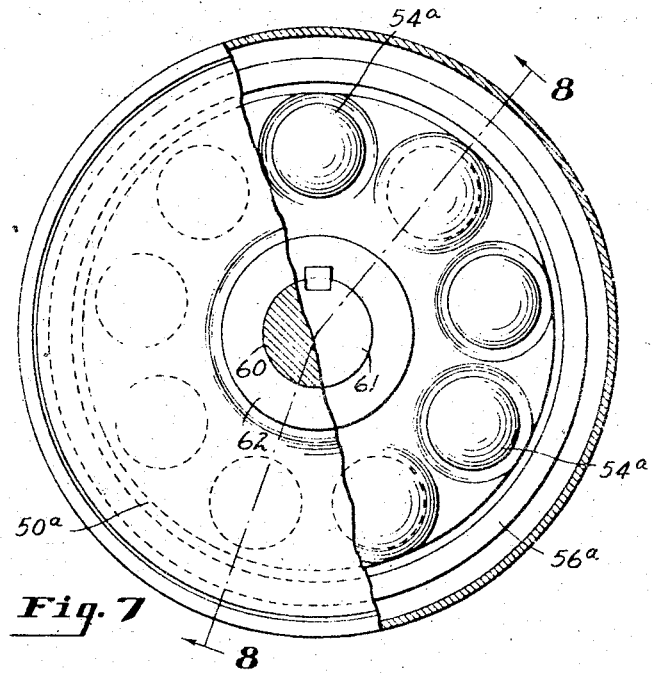
Fig. 7 is a sectional elevation of a flexible coupling, a part of which is shown in side elevation and a part in vertical section.
Figure 8:
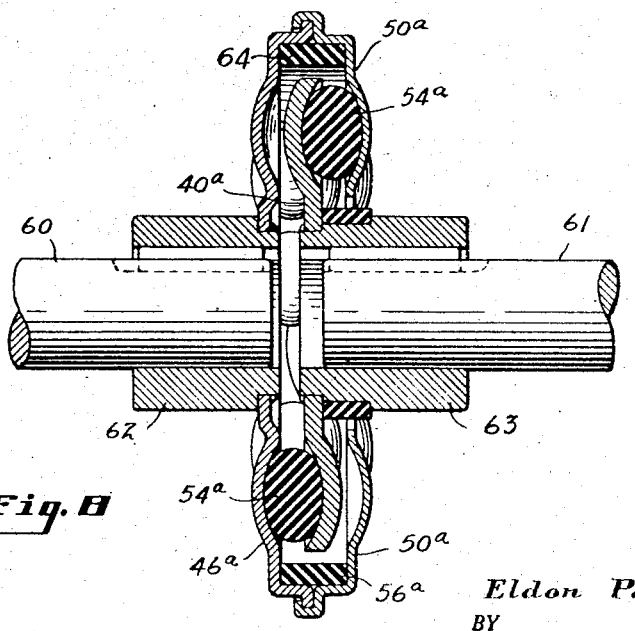
Fig. 8 is a section taken on the line indicated at 8—8 in Fig. 7.

In Figs. 7 and 8 of the drawings a flexible coupling is shown which employs connecting members substantially identical with the connecting members shown in Figs. 5 and 6. Corresponding parts are therefore designated by the same reference numerals as in Figs. 5 and 6, with the exponent *a* added. In the case of the flexible coupling two axially alined shafts 60 and 61 have collars 62 and 63 keyed thereto. A thrust transmitting disc 40a corresponding to the thrust transmitting disc 40 above described is fixed to the collar 63, and an annular channel form connecting member is attached to the collar 62, the channel form connecting member comprising a disc 46a and an annular plate 50a corresponding to the disc 46 and plate 50 shown in Figs. 5 and 6. Elastic rubber blocks 54a are interposed between the thrust transmitting disc 40a and the opposite walls of the channel member in the same manner as the blocks 54a above described. An annular bumper 56a may be mounted in the channel to surround the periphery of the disc in the same manner as the modification previously described, to limit the amplitude of lateral vibrations and a rubber band 64 may be mounted on the collar 63 alongside the disc 40a to provide an additional bumper between the annular plate 50a and the collar 63.

It is to be understood that variations and modifications of the specific devices herein shown and described for purposes of illustration, may be made without departing from the spirit of the invention.

What I claim is:

1. A flexible vibration damping connection comprising an inner connecting member including a disc, an outer annular connecting member encircling the disc and having an interiorly facing channel receiving the disc, and a series of circumferentially spaced cushioning blocks interposed between the disc and the walls of said channel, said blocks being disposed alternately between the disc and opposite side walls of the channel.

2. A flexible vibration damping connection comprising an inner connecting member including a disc having angularly spaced concavities in opposite faces thereof adjacent its periphery, the concavities of one face being interposed between concavities of the other, an outer annular connecting member encircling the disc and having an interiorly facing channel in which the peripheral portion of the disc is received, the walls of said channel having concavities adapted to register with concavities of the disc, and blocks of elastic rubber interposed between said disc and the walls of said channel and seated in the registering concavities of the disc and channel.

3. A flexible vibration damping connection comprising an inner connecting member including a disc, an outer annular connecting member encircling the disc and having a interiorly facing channel receiving the disc, elastic rubber cushioning members interposed between said disc and opposite side walls of the channel, and an elastic rubber bumper in the bottom of said channel overlying the periphery of said disc.

4. A flexible vibration damping connection comprising an inner connecting member including a disc having equiangularly spaced concavities on each of its faces, all of said concavities being equidistant from the axis of the disc and each concavity being located between oppositely facing concavities, an outer annular connecting member encircling the disc and having an interiorly facing channel to receive the peripheral portion of the disc, the sides of said channel having concavities registering with the concavities of the disc, and blocks of elastic rubber interposed between said disc and the opposite walls of the channel and seated in the registering concavities so that radial and torsional thrusts are imposed in shear on said blocks.

5. A flexible vibration damping support comprising a central post, a tubular member surrounding the post, two axially spaced rubber cushioning annuli interposed between the post and tubular member, a disc attached to the tubular member intermediate said annuli, an annular supporting member encircling said disc and having an inwardly facing channel to receive said disc, and angularly spaced cushioning blocks interposed between opposite sides of said disc and the walls of said channel, the blocks on one side of said disc being positioned between blocks on the opposite side thereof.

ELDON PAUL NEHER.

REFERENCES CITED

The following references are of record in the file of this patent:

UNITED STATES PATENTS

| Number | Name | Date |
|---|---|---|
| 2,179,959 | Schroedter | Nov. 14, 1939 |
| 2,387,065 | Harding | Oct. 16, 1945 |
| 2,417,096 | Thiry | Mar. 11, 1947 |